United States Patent
Jarvis et al.

(10) Patent No.: US 9,746,848 B2
(45) Date of Patent: Aug. 29, 2017

(54) SYSTEM AND METHOD FOR ADAPTIVE POSITIONING OF A WORK PIECE

(71) Applicant: Advanced Simulation Technology, Incorporated, Aston, PA (US)

(72) Inventors: Matthew T. Jarvis, Newark, DE (US); Mark A. Rogers, Newark, DE (US); Steven B. Lelinski, Wilmington, DE (US); Alvin Potter, Media, PA (US)

(*) Notice: Subject to any disclaimer, the term of this patent is extended or adjusted under 35 U.S.C. 154(b) by 0 days.

(21) Appl. No.: 14/885,987

(22) Filed: Oct. 16, 2015

(65) Prior Publication Data
US 2016/0139587 A1 May 19, 2016

Related U.S. Application Data

(60) Provisional application No. 62/080,282, filed on Nov. 15, 2014.

(51) Int. Cl.
G05B 19/402 (2006.01)

(52) U.S. Cl.
CPC .. G05B 19/402 (2013.01); *G05B 2219/42249* (2013.01)

(58) Field of Classification Search
CPC ............... G05B 19/402; G05B 2219/42249
USPC ........................................................ 700/186
See application file for complete search history.

(56) References Cited

U.S. PATENT DOCUMENTS

| | | |
|---|---|---|
| 5,148,591 A | 9/1992 | Pryor |
| 6,241,435 B1 | 6/2001 | Huang |
| 6,661,930 B1 | 12/2003 | Graham |
| 6,973,161 B2 | 12/2005 | Ohtsuki |
| 7,377,037 B2 | 5/2008 | Oullette |
| 7,591,078 B2 | 9/2009 | Crampton |
| 2006/0047457 A1* | 3/2006 | Agapiou ............... G01B 21/04 702/94 |
| 2006/0157456 A1 | 7/2006 | Hoebel |
| 2006/0217037 A1* | 9/2006 | Kalanovic ............. B24B 51/00 451/5 |
| 2007/0267104 A1* | 11/2007 | McGehee ................ B27C 1/12 144/373 |
| 2011/0295408 A1 | 12/2011 | Burgel |
| 2011/0301741 A1* | 12/2011 | Kayani ................ B23K 26/03 700/114 |
| 2012/0113268 A1* | 5/2012 | Ito ........................ H04N 5/2251 348/169 |

(Continued)

OTHER PUBLICATIONS

Olaiz, et al, "Adaptive fixturing system for the smart and flexible positioning of large volume workpieces in the wind-power industry," 24th CIRP Design Conference, Procedia CIRP 21 (2014) 183-188.

(Continued)

*Primary Examiner* — Kenneth M Lo
*Assistant Examiner* — Alan Chu
(74) *Attorney, Agent, or Firm* — Robert J. Yarbrough; Lipton, Weinberger & Husick

(57) ABSTRACT

The Invention is a system and method for adaptively attaching a work piece, especially an imprecise work piece, to a non-adaptive fixture that can be repeatably attached to one or more CNC machines. The Invention allows a work piece to be set up once for multiple machining operations. The Invention avoids the potential for errors and the cost and complexity inherent in adaptive machining and adaptive fixturing.

29 Claims, 14 Drawing Sheets

(56) References Cited

U.S. PATENT DOCUMENTS

2014/0009766 A1  1/2014  Zebe
2014/0257551 A1  9/2014  Junod
2015/0153728 A1* 6/2015  Eckley ............. G05B 19/41875
                                                          700/97

OTHER PUBLICATIONS

Papasthathis, et al, "Development of a reconfigurable fixture for the automated assembly and disassembly of high presure rotors for Rolls-Royce aero engines," S. Ratchev (Ed.): IPAS 2010, IFIP AICT 315 (2010) pp. 283-299.

* cited by examiner

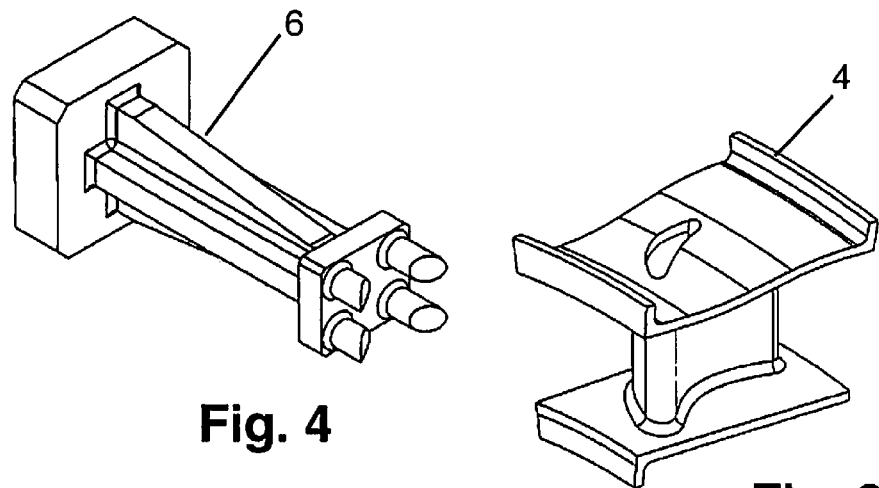
Fig. 4
Fig. 3
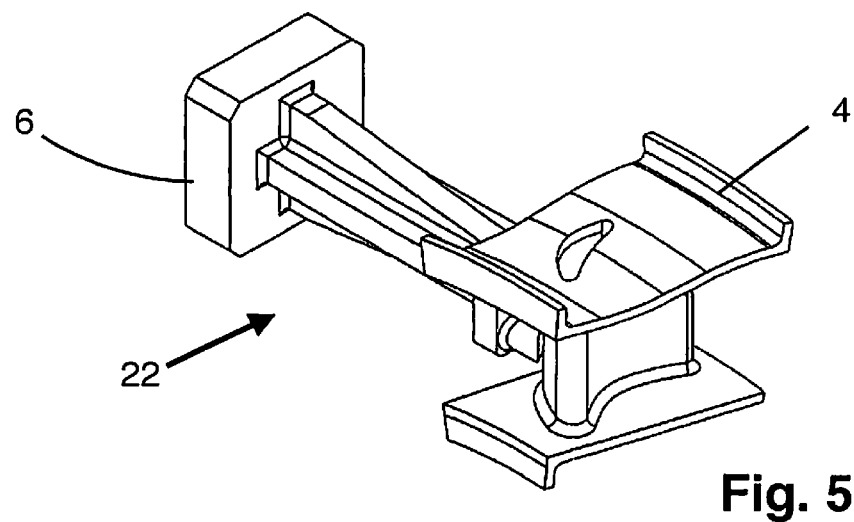
Fig. 5

SYSTEM AND METHOD FOR ADAPTIVE POSITIONING OF A WORK PIECE

I. STATEMENT OF RELATED APPLICATIONS

This application is entitled to priority from provisional patent application 62/080,282 filed Nov. 15, 2014 with Steven B. Lelinski as the first named inventor. The disclosure of application 62/080,282 is hereby incorporated by reference herein.

II. BACKGROUND OF THE INVENTION

A. Field of the Invention

The Invention relates to positioning and securing a work piece for accurate shaping of the work piece using computer numerical controlled (CNC) machines. Specifically, the Invention relates to the adaptive positioning and securing of an imprecise work piece, such as a casting, forging or composite layup, in a non-adaptive fixture where the fixture may be repeatably attached to the table or stage of one or more CNC machines.

B. Statement of the Related Art

As used in this document, a 'computer numerical controlled machine,' or 'CNC machine,' refers to a manufacturing apparatus having automated control of any shaping, subtractive or additive manufacturing process that describe a series of movements, and includes milling, turning, drilling, grinding, electric discharge machining, laser cutting, water jet cutting, welding, friction stir welding, ultrasonic welding, flame cutting, plasma cutting, bending, spinning, punching, pinning, gluing, fabric cutting, sewing, tape and fiber placement, routing, picking and placing, sawing and 3D printing. As used in this document 'CNC machine' also refers to any other automated manufacturing technology that utilizes a series of movements of a work piece or of a tool with respect to a work piece or of a work piece and a tool with respect to each other for the purpose of changing the shape of the work piece.

As used in this document, the term 'work piece' means the object to be shaped from an imprecise, rough condition to a finished machined object.

In a manufacturing operation utilizing a CNC machine, the work piece, the tool or both will move in a precisely described path under the control of a computer. The accuracy of the finished manufactured part relies on the accuracy of the movement of the tool and also relies upon the accuracy of the location of the work piece with respect to the tool. For a work piece that has imprecise dimensions, the dimensions of the work piece vary from work piece to work piece, making the repeatable production of precision manufactured parts problematic. Imprecise, variable work pieces are common in industrial casting and aerospace manufacturing and commonly include castings, forgings, and layups of a composite material, such as carbon fiber composite.

The problem is that each imprecise work piece defines unique manufacturing constraints to successfully produce the finished part; namely, each edge and surface of the finished part must fall within the volume defined by the work piece. In addition, the work piece may define additional constraints relating to manufacture or operation of the finished part, such as local internal changes in material specifications or strand orientation in the case of the carbon fiber composite. Each of those constraints limits the permissible locations and orientations of the work piece with respect to the tool that will result in high-quality finished parts and that will avoid rejected parts and waste.

The prior art reflects two approaches to the problem of the variable work piece: 'adaptive machining' and 'adaptive fixturing.' In adaptive machining, an imperfect work piece is first measured. The work piece is then attached to the CNC machine in the same orientation as each prior and each succeeding work piece. Due to variation between work pieces, the programmed movement of the tool of the CNC machine must be changed, or 'adapted,' for each work piece to conform to the measurements and other constraints of each work piece. A major disadvantage of adaptive machining is that the location of the work piece must be identified and the programming of the CNC machine must be changed with every succeeding work piece, with the resulting delay and opportunity for error. In addition, a typical machining operation for a complex manufactured part may require multiple sequential steps performed on multiple CNC machines. With each transfer of the work piece to a new CNC machine, the location and orientation of the work piece must be re-identified with respect to the tool and the programming of the CNC machine must be changed, multiplying the time required and opportunities for error by the number of CNC machines involved and reducing the capabilities of the system to those of the least capable CNC machine. Another disadvantage is that many CNC machines are not capable of the six degrees of freedom required to take full advantage of adaptive machining.

In adaptive fixturing, the work piece is attached to a movable fixture that is attached to the table or stage of the CNC machine. The work piece is measured at several locations. The work piece is moved by moving the adaptive fixture until the work piece is in a desired location and orientation with respect to the tool to 'adapt' for the imprecise shape of the work piece. The adaptive fixture is locked in position and the CNC machine activated to shape the work piece.

Like adaptive machining, adaptive fixturing has several deficiencies. First, the combination of the CNC machine and the adaptive fixture typically must be customized to a particular type of work piece and thus have very significant monetary and time costs associated with their development, as well as the loss of flexibility since the CNC machine and adaptive fixture combination cannot be used for other types of work pieces. Second, adaptive fixtures tend either to require tedious and time-consuming manual adjustment or to be bulky electromechanical devices that cannot be easily moved between CNC machines. The use of adaptive fixtures restricts the flexibility of the CNC machines and significantly increases cost, particularly when using adaptive fixturing on work pieces that require multiple processes on multiple CNC machines. Third, adaptive fixtures cannot comprehensively measure a part, which means that process adaptations cannot be based on areas of the part that are inaccessible for measurement when the part is in the work-holding position. Finally, due to prohibitive costs and complexity, adaptive fixtures typically do not have the full six degrees of spatial manipulation necessary to correct for certain positioning and manufacturing imperfections.

The prior art does not teach the work-holding system and method of the Invention.

III. BRIEF DESCRIPTION OF THE INVENTION

In its most basic form, the system and method of the Invention adaptively positions a work piece to a non-adaptive fixture that may be repeatably attached to one or more CNC machines. A measuring apparatus measures the work piece with enough detail and precision to allow a computer to determine an adaptive position of the work piece with respect to the non-adaptive fixture. A positioner holds the work piece while a locator apparatus measures a first position of the work piece. A computer determines a transformation to move the work piece from the first position to the adaptive position. The positioner moves the work piece to the adaptive position with respect to the fixture and the work piece is attached to the fixture. The combination of the work piece and fixture may be repeatably attached to one or more CNC machines for further manufacturing operations.

The locator apparatus and the measuring apparatus may be one and the same or may be different. The positioner may grip the work piece during either or both of the measurement process by the measuring apparatus or the location process by the locator apparatus.

As used in this document, the term 'fixture' means an appliance to which the work piece may be securely attached and which itself may be securely and repeatably attached to the table, stage or other work holding feature of one or more CNC machines. The fixture holds the work piece while the CNC machine performs the desired manufacturing operation on the work piece. A 'non-adaptive fixture' is a fixture that is not configured to be movable in multiple axes with respect to the tool of a CNC machine. The term 'repeatable' means that when the fixture is attached to a CNC machine, the fixture is in a known position with respect to the tool of each CNC machine for which the fixture is configured. The fixture may be removed and replaced on the table or stage of the CNC machines on multiple occasions and will be in the known location, to the required level of precision, each time. Any mechanism known in the art may be used for repeatable attachment of the fixture to the CNC machines, such as pin or dovetail connections. A pallet/chuck system produced by System 3R has proven suitable in practice. 3R is a Swedish company located at Sorterargatan 1 Vällingby, SWE16250 Sweden. The three parts of the system that has proven adequate for repeatable fixture positioning are: a "pallet" (3R-651.7E-P), a "chuck" (90809.01) and a "drawbar" (3R-605.02).

The measuring apparatus measures the work piece and determines the shape and measurements of the work piece in three dimensions. The measuring apparatus may be generic and comprehensive. As used in this document, the term "generic" means that the measuring apparatus is not limited to a particular type or family of work pieces, in contrast to hard gages that must be designed and manufactured to operate on a small number of work pieces with a specific geometry. As used in this document, the term 'comprehensive' means that the measuring apparatus can capture enough of the surfaces and internal or external geometry and dimensions of the work piece so that the computer can calculate an adaptive position of the work piece with respect to the non-adaptive fixture, and hence to the tool of the CNC machine, that accommodates all of the dimensions and constraints of the work piece.

The measuring apparatus may be a scanner and may utilize any suitable scanning technology known in the art. Suitable scanning technologies include both contact and non-contact technologies. An example of a contact technology is a coordinate measuring machine ('CMM'), which utilizes a moving arm to physically touch the work piece and to record the location of features of the work piece. Non-contact scanning technology may include light, ultrasound, x-ray scanning and magnetic resonance imaging. Light scanning may include triangulation, conoscopic holography, structured light, modulated light, and laser scanning of any suitable wavelength, including non-visible wavelengths. Light scanning may include stereoscopic and photometric passive scanning. X-ray scanning may include computed tomography (CT) scanning using X-rays to generate three-dimensional images of the internal structure of the work piece. Any other suitable scanning technology is contemplated by the Invention.

The measuring apparatus generates a data set corresponding to the three-dimensional shape and dimensions of the work piece. The computer compares the three-dimensional shape of the work piece and any other constraints presented by the work piece to the shape of the finished manufactured part, referred to herein as the 'machined object.' The computer determines a location and orientation of the work piece with respect to the non-adaptive fixture, and hence with the tool of a CNC machine, so that the CNC machine will be able to successfully shape the work piece without adapting the programming of the CNC machine to the specific work piece and without violating any of the constraints of the work piece. The location and orientation of the work piece with respect to the non-adaptive fixture that the computer determines will accommodate the three-dimensional shape and other constraints of the work piece is referred to herein as the 'adaptive position.'

For work pieces that will be attached to the fixture by an adhesive, the computer may consider the characteristics of the adhesive in determining the adaptive position of the work piece. The adhesive may shrink upon hardening in a predictable manner that can be modeled using any suitable technique, such as finite element analysis or finite difference analysis. The computer may perform the analysis to determine the change in position of the work piece during the adhesive hardening process and determine a location and orientation of the work piece on the fixture so that when the adhesive is fully hardened the work piece will be in the adaptive position and ready for CNC machine operations.

A locator apparatus performs a positioning measurement while a positioner grips and supports the work piece. The positioning measurement informs the computer of the first position of the work piece. The locator apparatus may perform the positioning measurement at the same time that the measuring apparatus performs the comprehensive measurement or at a different time. The locator apparatus may be the same as the measuring apparatus or may be different. The locator apparatus may utilize any suitable technology, which may include the technologies described above for the measuring apparatus.

As used in this document, the 'positioner' or 'positioning device' is any apparatus capable of supporting the work piece or the fixture or both and moving the work piece, the fixture or both under automated control to a desired location and orientation of the work piece with respect to the fixture. The positioner also may be capable of moving the work piece under automated control with respect to the measuring apparatus, the locator apparatus, or both the measuring apparatus and locator apparatus. A multi-axis positioning system driven by computer numerical control can be suitable. Examples of such devices include robotic arms, compound slides/rotary joints, and hexapod positioning devices. A gripper temporarily attaches the work piece to the positioning device and restrains and controls the work piece. The gripper does not need to produce a repeatable grasping position and orientation. The particular mechanism of the gripper is unimportant to the present invention.

The computer receives the first position information generated by the locator apparatus and performs a transformation to determine the necessary motions to move the work piece from the first position to the adaptive position. The computer instructs the positioner to perform the identified motions and the positioner moves the work piece to the adaptive position. Alternatively, the locator apparatus may collect enough information to allow the computer to locate the work piece approximately with respect to the fixture (and hence to the tool of the CNC machine). The computer then will move and re-measure the work piece iteratively until the work piece reaches the adaptive position with respect to the fixture.

The measuring apparatus may use one technology to scan the work piece to determine the shape of the work piece and the locator apparatus may use a second technology to locate the first position of the work piece in space with respect to the fixture. For example, a number of laser targets may be attached to the work piece prior to the measuring operation by the measuring apparatus. The laser targets are selected to respond strongly when illuminated by laser light from a three-dimensional laser scanner. The measuring apparatus then will scan the work piece with the laser targets attached using, for example, X-ray CT technology or structured light scanning. The measuring apparatus will detect the laser targets as physical objects and the computer will determine the location of the laser targets relative to the rest of the work piece. The locator apparatus, which is a laser scanner in this example, detects the first position of the work piece by the reflection of laser light from the laser targets. As the positioner positions the work piece with respect to the fixture, the laser scanner interacts with the laser targets and informs the computer of the location and orientation of the work piece, allowing the computer to accurately move the work piece to the adaptive position with respect to the fixture.

Alternatively, laser targets may be attached to the gripper and the computer may determine the location of the gripper with respect to the work piece during the locating step. The laser scanner interacts with the laser targets on the gripper to inform the computer of the location and orientation of the work piece, allowing the computer to move the work piece to the adaptive position.

Once the work piece is moved to the adaptive position with respect to the fixture, the work piece is attached to the fixture by any suitable means known in the art, such as adhesive, welding, brazing, fasteners or mechanical clamps, and the positioner releases the work piece. The work piece is now fully set up for further CNC machine operations.

The fixture with the work piece affixed is repeatably attached to the table, stage or other work-holding features of the CNC machine and the CNC machine is activated to shape the work piece. If there are additional steps in the shaping process to be performed by other CNC machines, the fixture is removed from the first CNC machine and repeatably attached to a second CNC machine without removing the work piece from the fixture between manufacturing steps. The second CNC machine is activated to further shape the part. The sequence of detachment and attachment is repeated until the last CNC machine has completed its operation on the work piece and the work piece becomes a finished part. It is not necessary to re-setup the work piece with respect to the fixture between CNC machine operations. It is not necessary to use adaptive machining or adaptive fixturing to adapt to an imprecise work piece.

The system and method of the Invention of adaptively positioning a work piece to a non-adaptive fixture offers several advantages over the prior art. Like adaptive machining and adaptive fixturing, the Invention dramatically improves process output quality over non-adaptive methods. Unlike adaptive machining and adaptive fixturing, the Invention allows adaptive process corrections to be made only once, during work piece setup, and no further process adaptations are required for each subsequent CNC machining operation. The Invention saves setup time and reduces the probability of errors associated with the need for adaptive corrections at each manufacturing step. The Invention is thus more suitable for a production environment than adaptive machining or adaptive fixturing while producing finished parts of comparable quality.

In comparison to traditional adaptive fixturing, the adaptive positioning system of the Invention also offers the advantages that it may be generic and flexible; namely, the measuring apparatus, the positioner, the locator apparatus and the software are not customized and hence not limited to a particular family or type of work piece or to any particular CNC machine. Only the digital positioning methodology and the final work-holding fixture vary between work piece types, and the use of technologies such as adhesive work holding can allow such fixtures to be very small and simple. As a consequence, the present Invention can be easily configured to work with different types of work pieces and can be switched between different types of work pieces on the fly. The reduced time and cost resulting from such flexibility and simplified final fixturing, as well as the full six degrees of spatial correction offered through the present Invention, represents an enormous advantage over adaptive fixtures.

Because of the flexible, generic and non-custom nature of the adaptive positioning system of the Invention, the system and method can provide fixtures combined with fully setup work pieces simultaneously to different CNC machines having different capabilities and producing different products. Work piece setup on the fixtures also may be accomplished remotely from the manufacturing operations and in parallel with other operations.

The adaptive positioning system and method of the invention also allows the process of adaptation to the constraints of the work piece to be extended to CNC machines that are not equipped for movement in a full six degrees of freedom, as needed for fully adaptive machining. The adaptive movement of the work piece is accomplished in the positioning stage, before the work piece ever sees a CNC machine. The manufacturer therefore may use less capable and hence less expensive CNC machines for adaptive manufacturing, further reducing cost.

The adaptive positioning system and method of the Invention may be used to correct for generalized defects and variation produced in earlier manufacturing steps. It may also be used to correct for positioning uncertainty in locating a part in a work-holding system due to the nature of the part geometry, regardless of how perfect it is. And finally, because of the system's ability to replicate arbitrary positions, it can be used to reposition a specific work piece to replicate an earlier position, such as in the case of a work piece which came unrestrained in the middle of a manufacturing process and needs to be re-setup and finished.

IV. BRIEF DESCRIPTION OF THE DRAWINGS

FIG. 3 shows a work piece.

FIG. 4 shows a fixture.

FIG. 5 illustrates a work piece attached to a fixture.

FIG. 12A is a detail of FIG. 12.

FIG. 13A is a detail of FIG. 13.

V. DESCRIPTION OF AN EMBODIMENT

Figure 1:
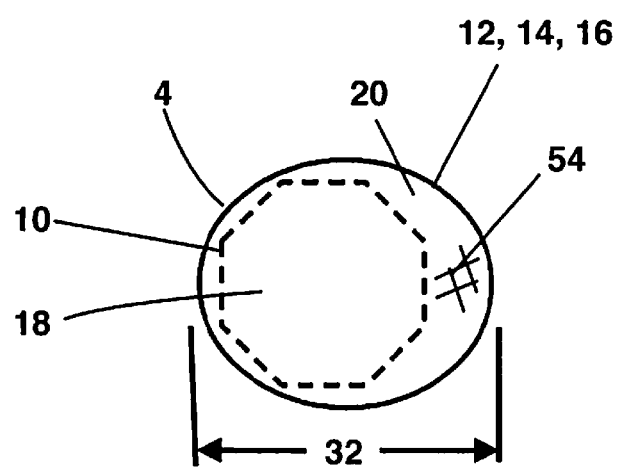
FIG. 1 is a cross section of a work piece indicating the location of the machined object.
Figure 2:
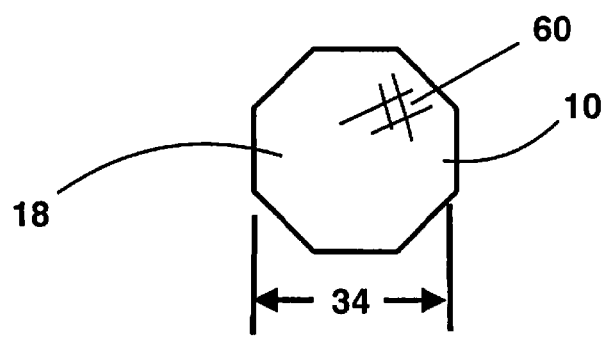
FIG. 2 is a cross section of the machined object.

The invention is an adaptive positioning system 2 for positioning a work piece 4 to a non-adaptive fixture 6 for use on a CNC machine 8 to turn the work piece 4 into a machined object 10. As shown by FIGS. 1 and 2, a CNC machine 8 changes the shape of a work piece 4 to produce the machined object 10. While the system 2 of the invention is most useful for operations on an imprecise work piece 4, such as a casting 12, forging 14 or layup 16, the system 2 is applicable to any work piece 4, regardless of the precision of the work piece 4.

FIG. 1 shows a section of a work piece 4 and FIG. 2 shows a section of the corresponding machined object 10. Dashed lines on FIG. 1 show the location of the machined object 10 within the work piece 4. The machined object volume 18, including each dimension 34, edge and surface of the machined object 10, must fall within the work piece volume 20 defined by the work piece 4.

FIG. 3 shows a work piece 4 typical of an aerospace work piece 4 that is a casting 12, forging 14 or layup 16 and that has dimensional imperfections. The work piece 4, shown by FIG. 3, must be secured to a fixture 6, shown by FIG. 4, to create a single rigid assembly 22, shown by FIG. 5, such that the work piece 4 will be presented optimally to a CNC machine 8 when the fixture 6 is repeatably attached to one or more CNC machines 8 in later steps. Any error in the positioning of the work piece 4 in the fixture 6 will result in manufacturing error during subsequent operations.

Figure 6:
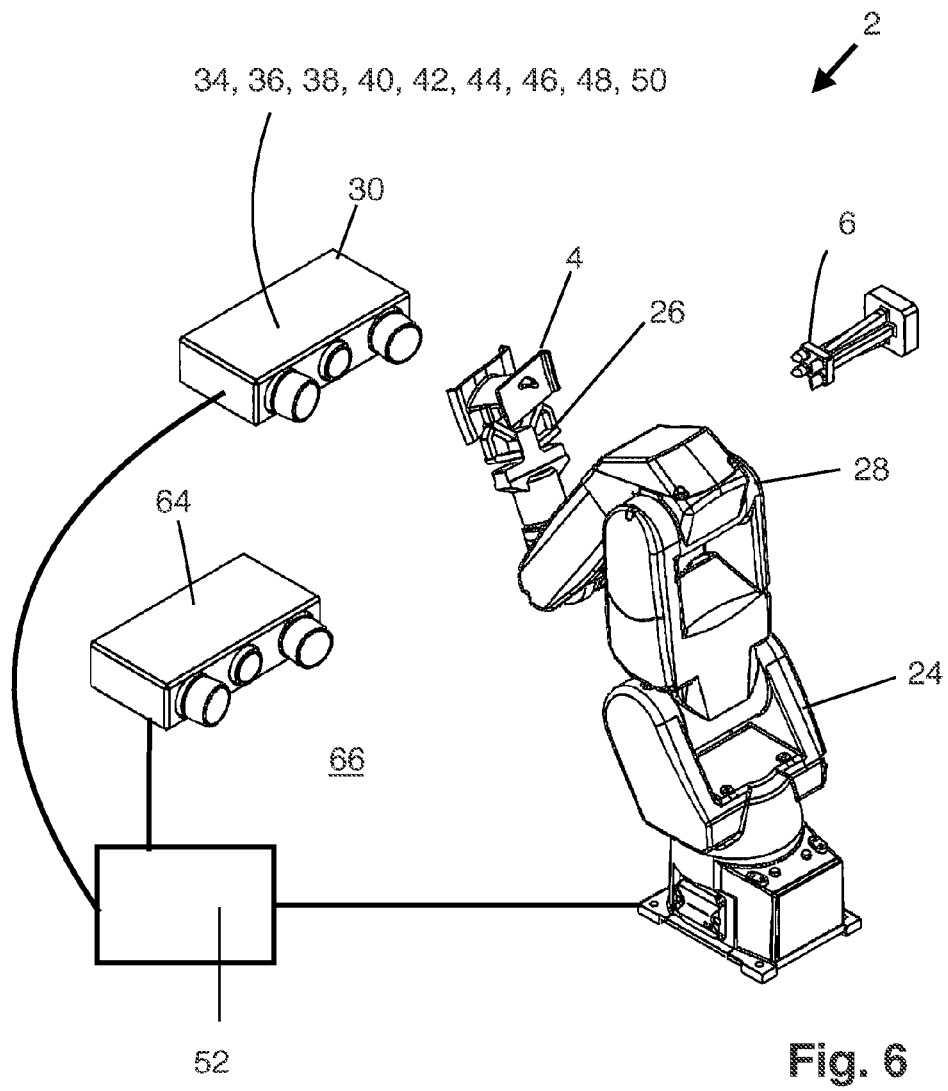
FIG. 6 shows an embodiment of the adaptive positioning system having separate measuring and locator apparatus.
Figure 7:
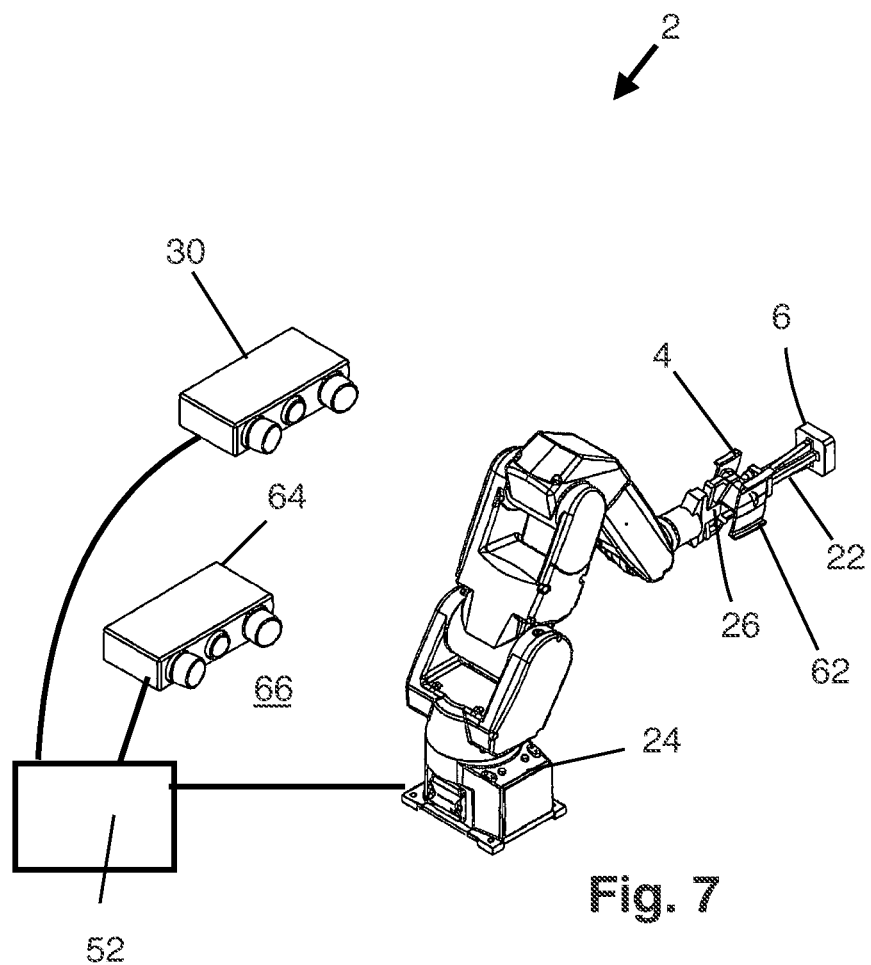
FIG. 7 illustrates the same embodiment as FIG. 6 with the robotic arm adaptively positioning the work piece in the fixture.

FIGS. 6 and 7 show a first embodiment of the adaptive positioning system 2 of the Invention. A positioner 24 is under the control of a computer 52. The positioner 24 of the embodiment of FIGS. 6 and 7 is a gripper 26 attached to the end of a multi-axis robotic arm 28. The gripper 26 holds the work piece 4. FIG. 6 shows the positioner 24 exhibiting the work piece 4 to a measuring apparatus 30. The measuring apparatus 30 may be, for example, a contact scanner 34 such as a coordinate measuring machine 36, a non-contact scanner 38 such as a light scanner 40, a structured light scanner 42, a laser scanner 44, an ultrasound scanner 46, an x-ray scanner 48, a magnetic resonance imager 50, or any other suitable scanner known in the art. The measuring apparatus 30 is capable of performing a 'comprehensive measurement' 32 of the work piece 4; namely, the measuring apparatus 30 is capable of detecting the shape and dimensions of the work piece 4 to an adequate level of detail and accuracy so that the computer 52 can determine an adaptive position 62, as defined below, of the work piece 4 with respect to the fixture 6 and hence with respect to the tool of a CNC machine 8.

If the computer 52 of FIG. 6 requires more information from the measuring apparatus 30 for a comprehensive measurement 32 than is available from a single orientation of the work piece 4, the computer 52 may instruct the positioner 24 to move the work piece 4 to exhibit a different aspect of the work piece 4 to the measuring apparatus 30. The measuring apparatus 30 may then scan a first portion of the work piece 4 and a second portion of the work piece 4. If the shape of the work piece 4 at the location gripped by the gripper 26 is important for the computer 52 to determine the comprehensive measurement 32, then the computer 52 may instruct the positioner 24 to put down the work piece 4, reposition the positioner 24, pick up the work piece 4 a second time and exhibit the repositioned work piece 4 to the measurement apparatus 30. The computer 52 will combine the measurements of the first portion and second portion of the work piece 4 to determine a comprehensive measurement 32 of the work piece 4.

The computer 52 of FIG. 6 considers the comprehensive measurement 32 and determines the adaptive position 62 of the work piece 4. The 'adaptive position' 62 is the location and orientation of the work piece 4 with respect to the fixture 6 that will result in the machined object volume 18 being disposed within the work piece volume 20 when the work piece 4 is attached to the fixture 6, the fixture 6 is repeatably attached to the CNC machine 8, and machining operations are performed by the CNC machine 8 on the work piece 4.

In determining the adaptive position 62 of the work piece 4, the computer 52 also considers all other constraints 54 that apply to the work piece 4. A constraint 54 includes all limitations of a work piece 4 other than its dimensions 34 and includes local characteristics 58 of the material 56 of which the work piece 4 is composed. For example, a work piece 4 that is a layup 16 may have carbon fiber characteristics or orientation that differ from one location to another within the work piece 4. That local characteristic 58 may have a desired location 60 within the machined object 10.

The computer 52 may determine the adaptive position 62 of the work piece 4 that places the local characteristic 58 of the work piece 4 in the desired location 60 within the machined object 10.

In addition to the above, the term 'constraints' 54 also includes any other local physical, chemical, metallurgical or other property of the work piece 4 that may vary between one location and another in the work piece 4 and that may affect the production or performance of the machined object 10. Physical, chemical or metallurgical properties include, for example and without limitation, thermal or electrical conductivity, modulus of elasticity, reactivity and resistance to corrosion, local composition or concentration of an alloying material, or crystal size, shape or orientation. As a specific example, if thermal conduction is important in a machined object 10 and if an imprecise work piece 4 has a portion with a cross section that is too small for the design heat conduction, the computer 52 may select an adaptive position 62 that provides a larger cross section of the work piece 4 or a region of the work piece 4 that has a higher thermal conductivity to achieve the needed heat conduction of the machined object 10.

The computer 52 of FIGS. 6 and 7 must determine a first position 68 (shown by FIG. 8) of the work piece 4 in three-dimensional space to be able to instruct the positioner 24 to move the work piece 4 to the adaptive position 62. To determine the first position 68, the positioner 24 moves the work piece 4 to a scanning location 66 and exhibits the work piece 4 to a locator apparatus 64. The locator apparatus 64 may use any scanning technology known in the art to determine the first position 68 of the work piece 4 to a suitable level of accuracy. The computer then calculates a transformation to determine the necessary movements of the positioner 24 to move the work piece 4 from the first position 68 to the adaptive position 62 with respect to the fixture 6.

As shown by FIG. 7, the computer 52 commands the positioner 24 to move the work piece 4 to the adaptive position 62 from the first position 68 for attachment to the fixture 6. In this embodiment, adhesives are used to secure the work piece 4 of the fixture 6, although any other suitable attachment mechanism known in the art may be used to attach the work piece 4 to the fixture 6, such as clamps, fasteners, brazing or welding. Upon curing of the adhesive, the single rigid assembly 22 of the work piece 4 and fixture 6 is then available for repeatable attachment to CNC machines for shaping of the work piece 4, all without requiring use of adaptive fixtures and without requiring changing of the programming of the CNC machines 8 to adapt to the individual work pieces 4.

The locator apparatus 64 may have a scanning location 66 that is separate from the measurement apparatus 30, as shown by FIGS. 6 and 7. Alternatively, the scanning location 66 of the locator apparatus 64 may be the same as for the measurement apparatus 30, as shown by FIGS. 8 and 9.

Figure 8:
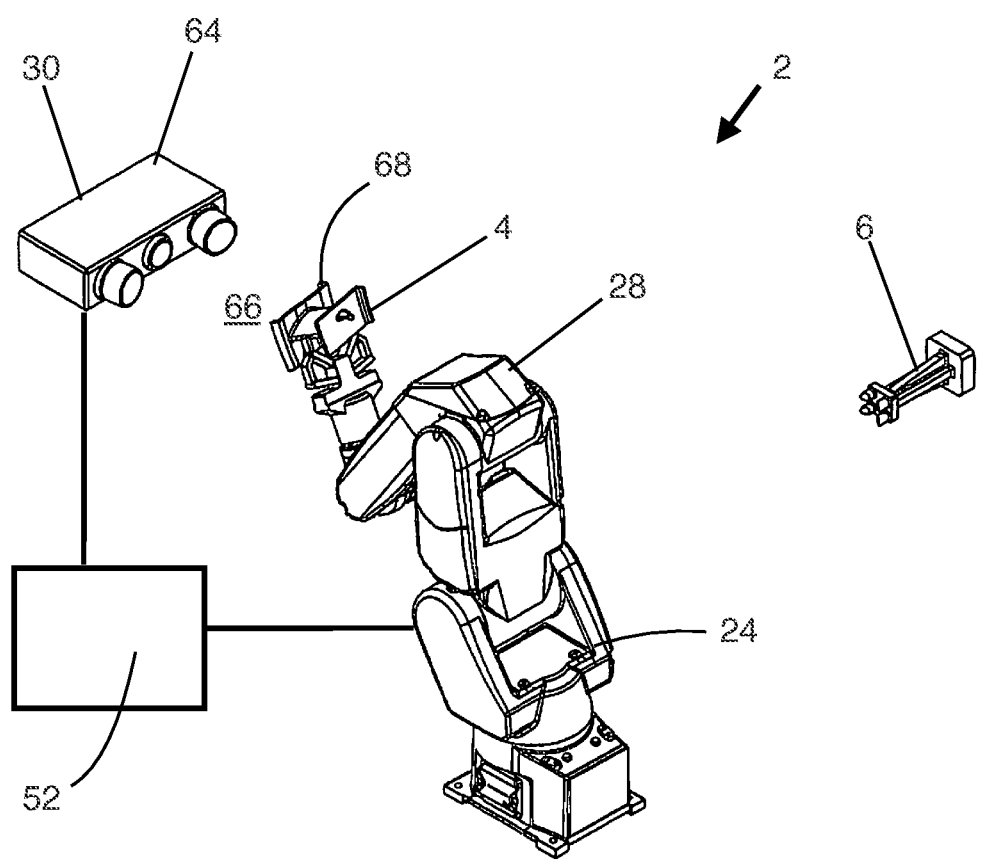
FIG. 8 illustrates an embodiment of the adaptive positioning system in which the measuring apparatus and the locator apparatus are one and the same.
Figure 9:
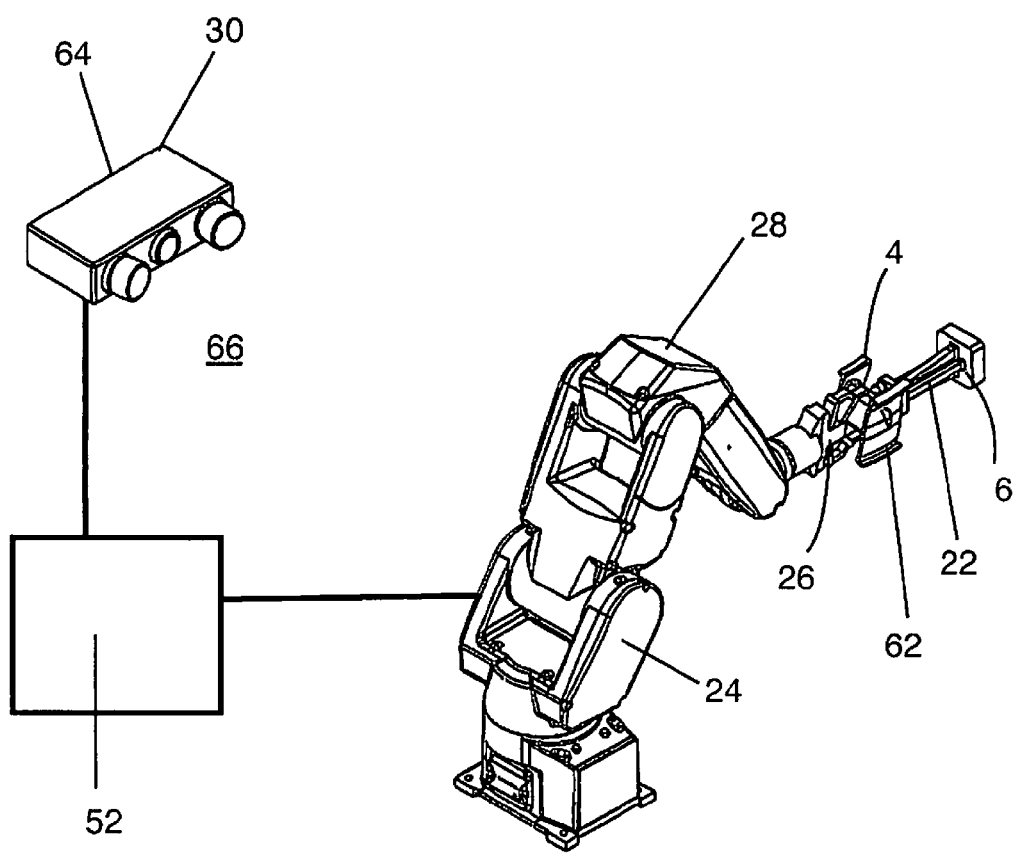
FIG. 9 shows the embodiment of FIG. 8 with the robotic arm adaptively positioning the work piece in the fixture.

Also as shown by FIGS. 8 and 9, the locator apparatus 64 may be incorporated into the measuring apparatus 30. Alternatively, the locator apparatus 64 and the measuring apparatus 30 may be one and the same, also as shown by FIGS. 8 and 9. Where the locator apparatus 64 and measuring apparatus 30 have the same scanning location 66 or where the locator apparatus 64 and measuring apparatus 30 are one and the same, the computer 52 may be configured to determine the comprehensive measurements 32 and first position 68 simultaneously.

Figure 10:
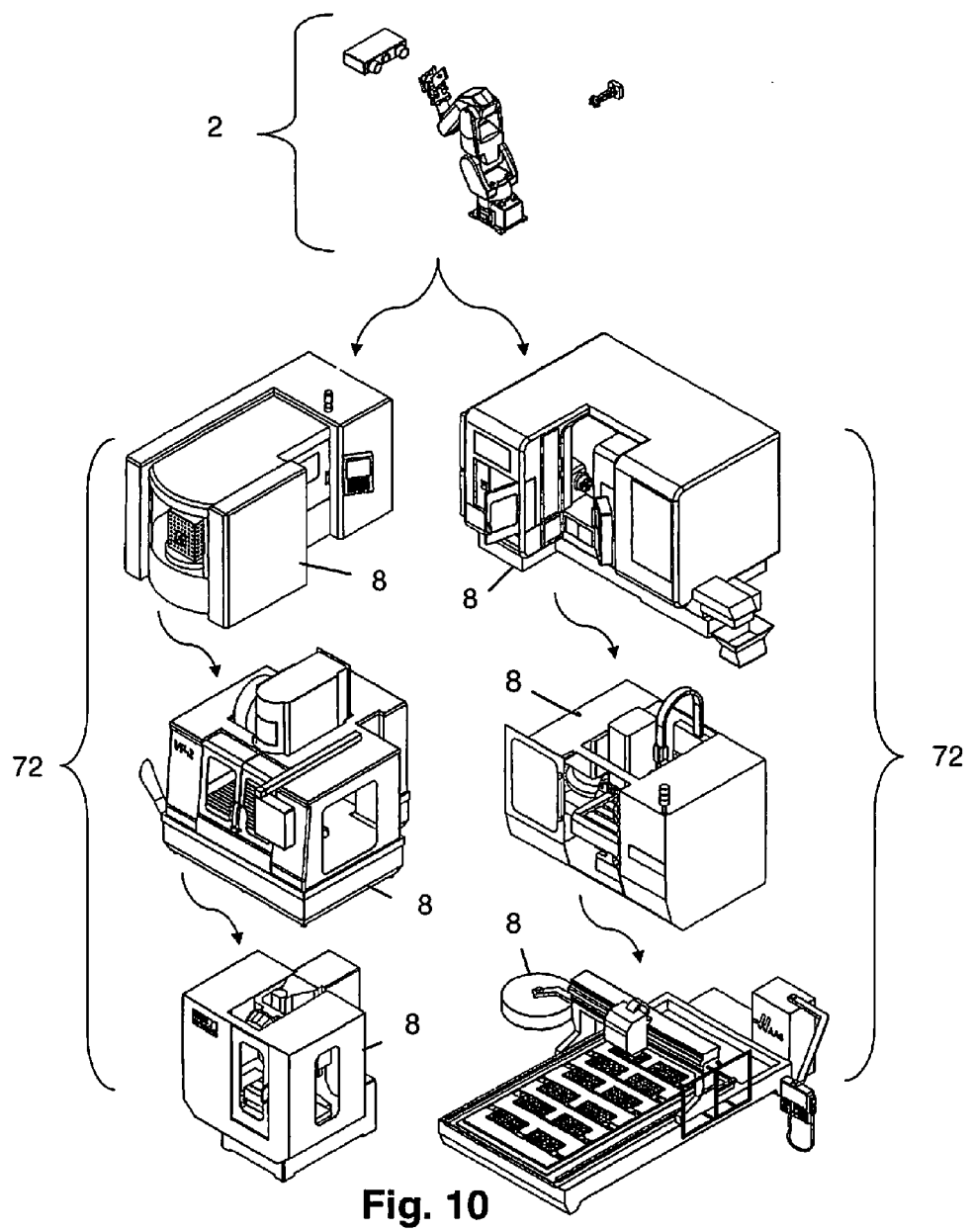
FIG. 10 illustrates that the adaptive positioning system of the Invention is flexible and may simultaneously serve different CNC machines producing different products.

FIG. 10 is a schematic diagram illustrating that the adaptive positioning system 2 of the Invention is highly flexible and may serve two or more series 72 of CNC machines 8 simultaneously, setting up different work pieces 4 to different fixtures 6 and producing different machined objects 10 from each series 72. The CNC machines 8 in each series 72 perform sequential operations on the work piece 4 to produce the machined object 10. The adaptive positioning system 2 may be located separately from the CNC machines 8.

Figure 11:
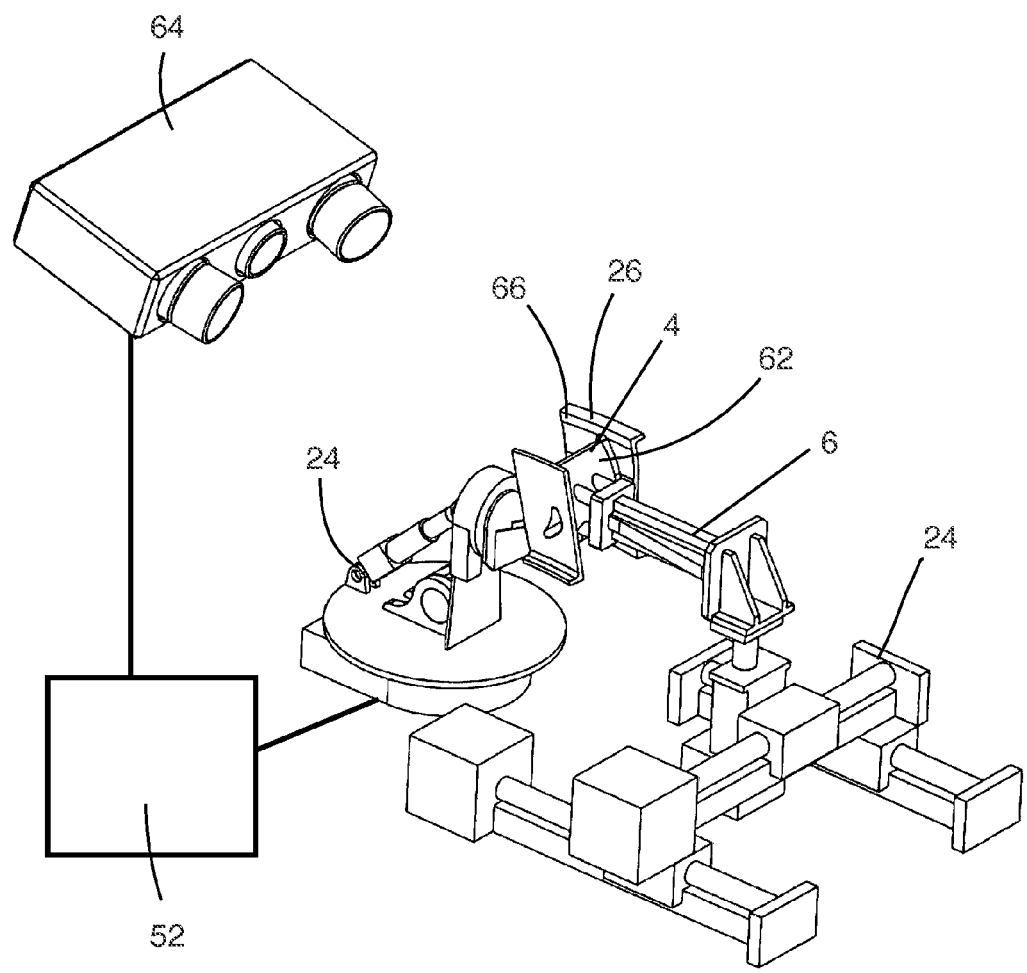
FIG. 11 is an embodiment of the adaptive positioning system using a 3D structured light scanner in conjunction with a series of compound slides and rotary joints, showing that both the fixture and work piece may move with respect to each other.

FIG. 11 shows that the fixture 6 may be moved to the adaptive location 62 with respect to the work piece 4 or both the fixture 6 and work piece 4 may be moved to the adaptive position 62 with respect to each other. The work piece 4 is placed in a gripper 26 on a multi-axis positioner 24, in this case a series of compound slides and rotary joints, and minimal surface capture is used to extrapolate the first position 68 of the work piece 4. The computer 52 then considers the adaptive position 62 of the work piece 4 determined at a prior time using a separate measuring apparatus 30, not shown of FIG. 11. The computer 52 transforms the first position 68 to the adaptive position 62, and the compound slides and rotary joints move the work piece 4 and the fixture 6 with respect to each other so that the work piece 4 is in the adaptive position 62 with respect to the fixture 6.

For all of the embodiments discussed above, the computer 52 can calculate the transformation to move the work piece 4 and/or the fixture 6 from the first position 68 to the adaptive position 62 either through well-established inverse kinematics methods or through an iterative correction process. The advantage of the separate measuring apparatus 30 and locator apparatus 64, such as the separate locator apparatus shown in the embodiment of FIG. 11, is that the entire work piece 4 can be observed by the separate measuring apparatus 30 and the desired adaptive position 62 can be computed with work piece 4 geometry that is occluded (that is, the view of the work piece 4 is blocked) when the work piece 4 is in the scanning location 66 of the locator apparatus 64.

Figures 12, 12A:
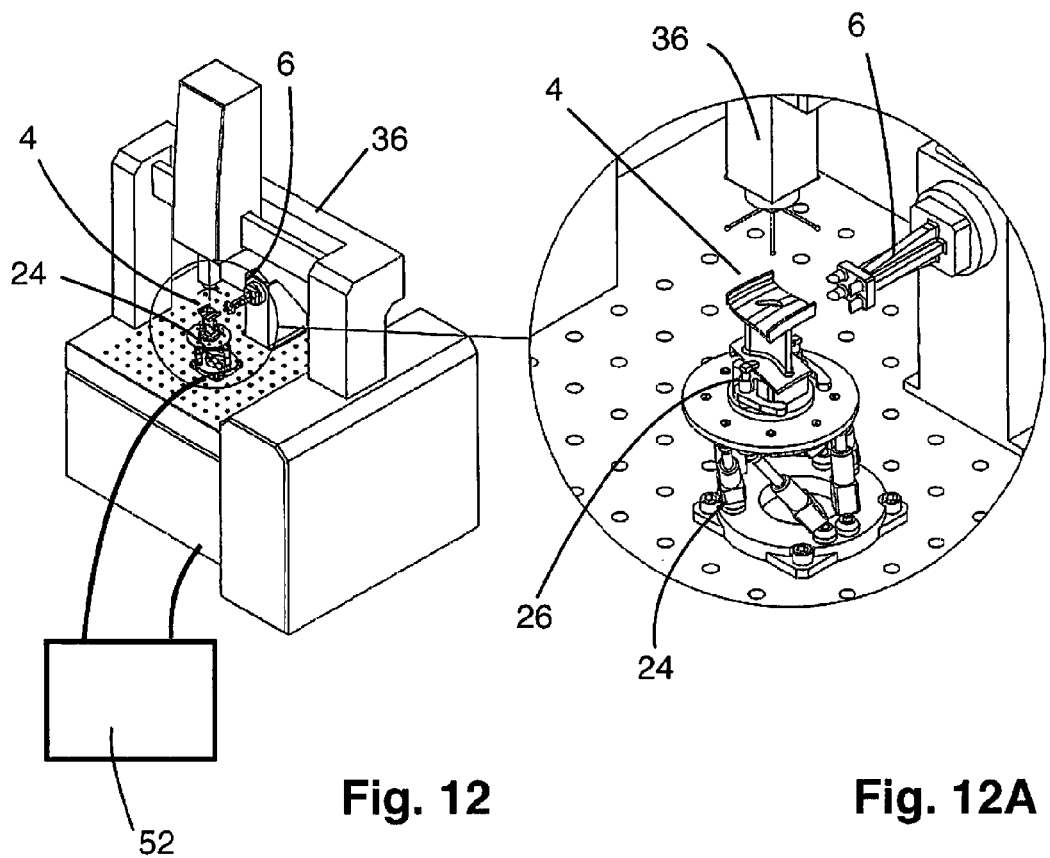
FIGS. 12 and 12A illustrate an embodiment utilizing a coordinate measuring machine ('CMM') scanner to determine the 3D shape of the work piece and a hexapod table to position the work piece with respect to the fixture.

FIG. 12 and detail FIG. 12A are perspective views of another embodiment of the invention utilizing contact scanning of the work piece. FIG. 12A is a detail view of a portion of FIG. 12. As shown by FIGS. 12 and 12A, a work piece 4 is secured by a gripper 26 that is mounted to a multi-axis positioner 24, in this case a hexapod table. This assembly is located on the table of a coordinate measuring machine ('CMM') 36, which defines both the measuring apparatus 30 and the locator apparatus 64. The computer 52 is operably connected to the CMM 36 and to the multi-axis positioner 24. The CMM 36, acting as the measuring apparatus 30, uses its probe array to determine a comprehensive measurement 32 of the work piece 4 and the computer 52 uses a fitting algorithm to identify the adaptive position 62. The CMM 36, acting as the locator apparatus 64, determines the first position 68 of the work piece 4. The fixture 6 is located on a bracket mounted to the table of the CMM 36. The computer 52 instructs the multi-axis positioner 24 to bring the work piece 4 to the adaptive position 62 with respect to the fixture 6. The work piece 4 then is attached to the fixture 6 as described above and is fully set up for further CNC machine 8 operations.

Figures 13, 13A:
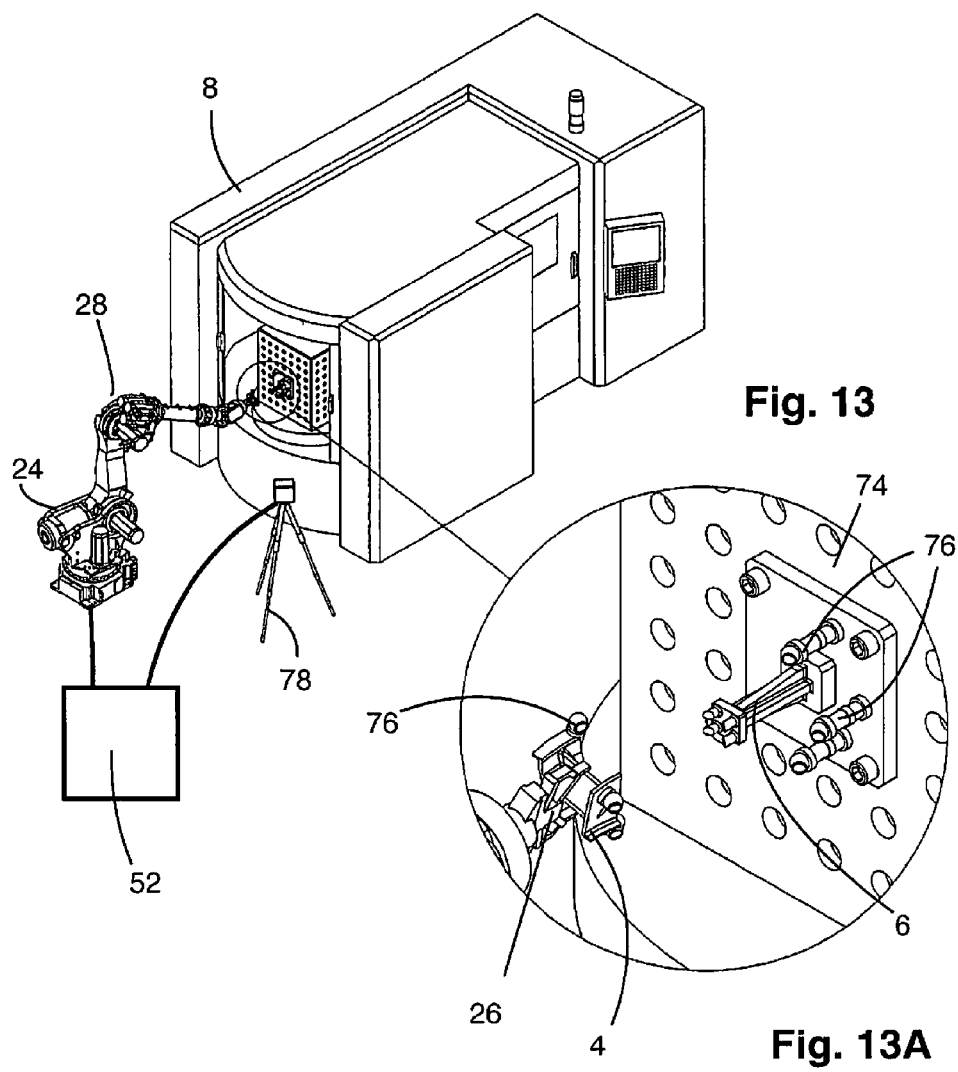
FIGS. 13 and 13A illustrate the adaptive positioning system of the Invention used to attach a work piece to the work-holding feature of a CNC machine.

FIG. 13 and detail FIG. 13A are perspective views of another embodiment of the invention and illustrate that the techniques of the Invention can be used to adaptively mount a work piece 4 directly to a fixture 6 attached to a CNC machine 8, bypassing the step of attaching the work piece 4 to the fixture 6 separate from the CNC machine 8. As shown by FIG. 13A, which is a detail of FIG. 13, a fixture 6 is attached to the work holding feature 74 of the CNC machine 8. In FIGS. 13 and 13A, a work piece 4 is grasped by a gripper 26 that is mounted to a multi-axis positioner 24, in this case a large, floor mounted robot arm 28, under the control of a computer 52. The robot arm 28 sits in the loading area of a CNC machine 8, in this case a horizontal milling machine.

From FIGS. 13 and 13A, a laser tracking device 78 informs the computer 52 of the first position 68 of the work piece 4. Using the adaptive position 62 data from a previous comprehensive measurement 32, the computer 52 is programmed to determine the appropriate transformation to bring the work piece 4 into the adaptive position 62. The computer 52 then uses an inverse kinematics method to determine the robot 8 joint positions to place the work piece 4 in adaptive position 62 and instructs the robotic arm 28 to make the necessary movements. The robotic arm 28 moves the work piece to the adaptive position 62 with respect to the fixture 6. The work piece 4 is adhered to the fixture 6. The gripper 26 then releases the work piece 4 and retracts from the loading area of the CNC machine 8. The CNC machine 8 is closed and the milling operation begins.

FIGS. 13 and 13A also illustrate using laser targets 76 for positioning the work piece 4 with respect to the fixture 6. Three spherically mounted retro-reflectors, which are laser targets 76, are attached to the work holding feature 74 of the CNC machine 8 and another three laser targets 76 are mounted to the work piece 4. The laser tracking device 78 located in the viewing area of the CNC machine 8 measures the locations of all laser targets 76, evaluating the first position 68 of the work piece 4 with respect to the fixture 6. The laser targets 76 can be removed after the work piece 4 is in the adaptive position 62, if desired.

Alternatively, laser targets 76 may be attached to the gripper 26 rather than to the work piece 4. The locator apparatus 64 determines the location of the work piece 4 with respect to the gripper 26 and also determines the location of the gripper 26 with respect to the adaptive position 62. The computer 52 monitors the position of the work piece 4 with respect to the fixture 6 by monitoring the location of the laser targets 76 on the gripper 26 with respect to the fixture 6.

Figure 14:
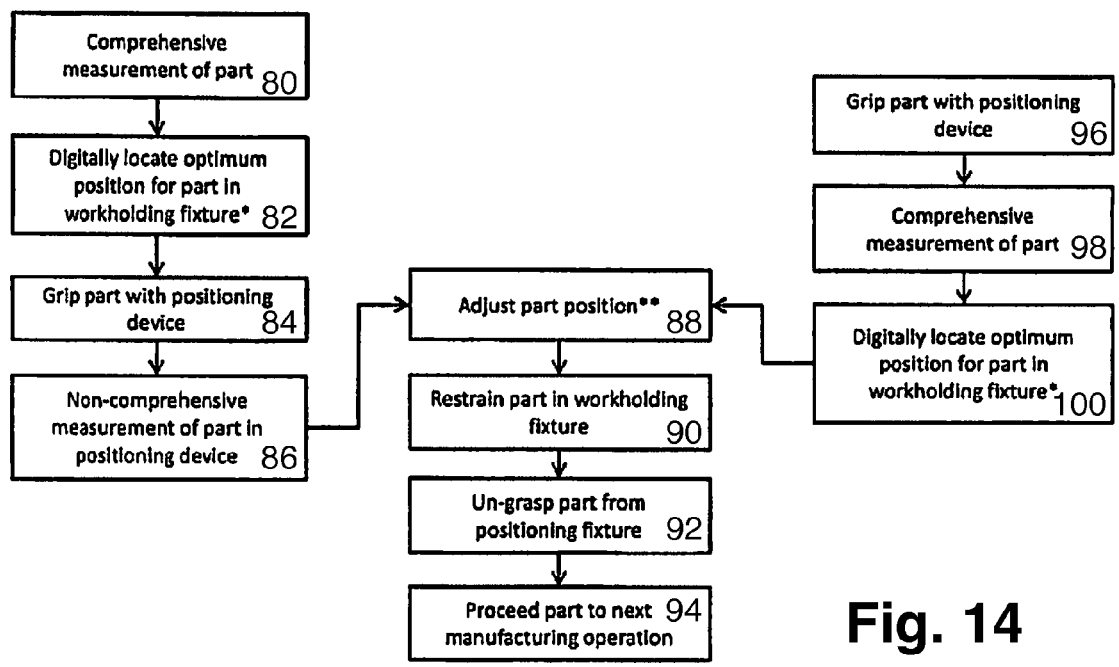
FIG. 14 is a block diagram of the typical measurement and positioning process for two different classes of embodiment: those with combined comprehensive and positional measurement, and those with separate comprehensive and positional measurement.

FIG. 14 shows the start-to-finish process flow of the invention for two different classes of embodiments. The first class shown by steps 80-94 takes the comprehensive measurements separately from the positioning measurements, and the second class of steps 96-100 and 88-94 combines the comprehensive and positioning measurements. From step 80 of FIG. 14, the work piece 4 is 'comprehensively' measured, as that term is defined above using measuring apparatus 30 and using any of the techniques described above. In step 82, the computer 52 identifies an adaptive position 62 of the work piece 4 with respect to the tool of the CNC machine 8 that conforms to all of the constraints 54 of the work piece 4, as described above. The positioner 24 grips the work piece 4 in step 84. In step 86 a locator apparatus 64 performs a separate, non-comprehensive measurement of enough of the work piece 4 to allow accurate location of the work piece 4 in space to determine the first position 68 of the work piece 4. In step 88, the computer 52 directs the positioner 24 to move the work piece 4 from the first position 68 to the adaptive position 62 with respect to the fixture 6. In step 90 the work piece 4 is attached to the fixture 6 in the adaptive position 62. In steps 92 and 94 the work piece 4 is released by the positioner 24 and the combination 22 of the fixture 6 and work piece 4 moves to the next manufacturing step.

From steps 96-100 of FIG. 14, the work piece 4 s gripped by the positioner 24 (step 96) and comprehensively measured (step 98), as described above. The measuring apparatus 30 also performs the function of the locator apparatus 64 and determines the position of the work piece 4 in space. In step 100, a computer 52 considers the information gathered and determines the adaptive position 62 of the work piece 4 in the fixture 6 as described above. The computer 52 also performs the necessary transforms to determine the motion of the positioner 24 to move the work piece 4 to the desired adaptive position 62 on the fixture 6. Steps 88 through 94, described above, also apply to steps 96-100.

Figure 15:
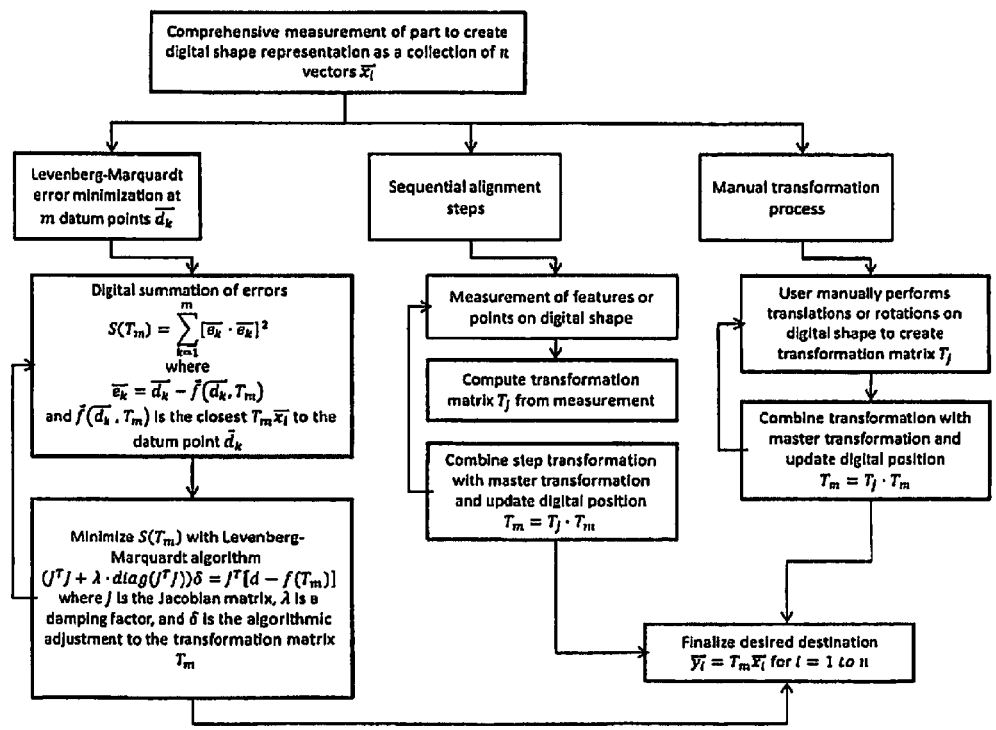
FIG. 15 is a block diagram that demonstrates three example methodologies for the creation of a desired adaptive position from the data collected by comprehensive measurement.

FIG. 15 shows three example methods for digital optimization of the adaptive position 62 of the work piece 4 with varying degrees of automation. In all cases the process begins with a digital shape representation resulting from a comprehensive measurement 32 of the work piece 4, the result of which typically is stored as a point cloud or unstructured triangular mesh in an arbitrary coordinate system. This representation is then moved to the adaptive position 62 in a virtual version of the fixture 6 through a set of user-defined criteria. The measurement starting position is arbitrary and unimportant. All three of the example methods produce a single transformation matrix that is then used to transform the digital shape representation to the desired position and orientation in space. Any other methods for determining the adaptive position 62 of the work piece 4 that will allow the work piece 4 to be shaped by one or more CNC machines 18 without infringing on any of the constraints 54 of the work piece 4 is contemplated by the Invention.

Figure 16:
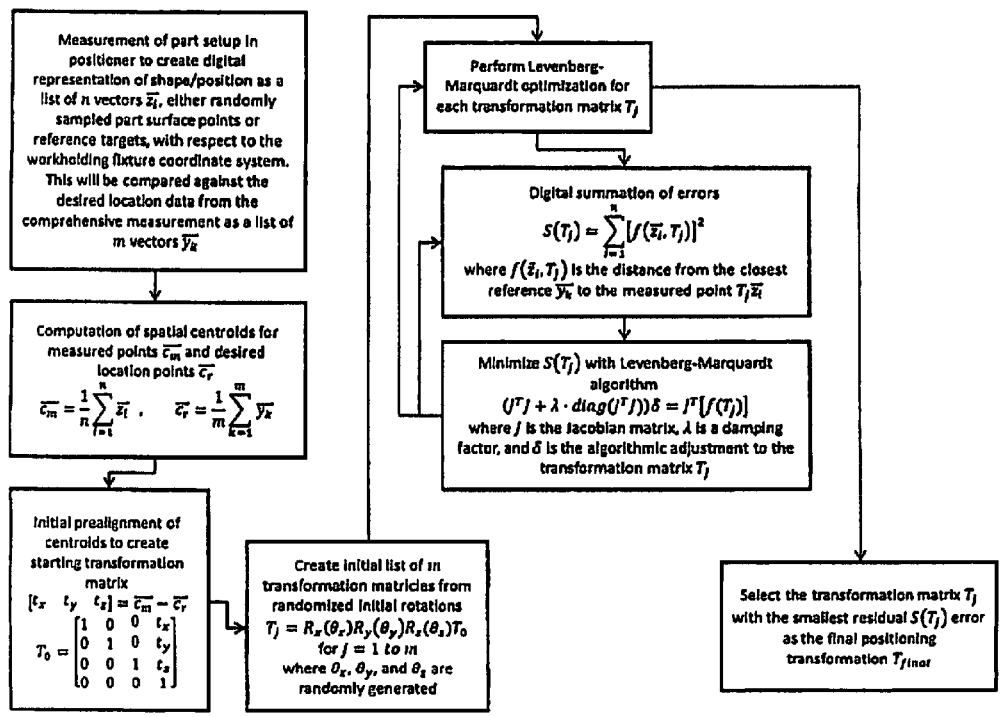
FIG. 16 is a block diagram that demonstrates an example process for creating the positioning transform from the first position to the adaptive position.

FIG. 16 demonstrates an example algorithm for computing the transformation for the movement of the work piece 4 from the first position 68 as determined by the locator apparatus 64 to the desired adaptive position 62 with respect to the fixture 6. This algorithm is a Levenberg-Marquardt best fit with a pre-alignment stage and a series of restarts to compensate for work piece 4 symmetry and the potentially more limited access and capabilities of the positioning measurement. This algorithm works equally well when the positioning measurement is a point cloud or unstructured mesh, or a series of several rigidly attached reference targets.

The reference target method will work much faster. Reference targets, such as the laser targets 76 described in relation to FIGS. 13 and 13A, may be rigidly attached to the work piece 4 or to the gripper 26. The computer 52 may monitor the location and orientation of the work piece 4 by monitoring the location of the laser targets 76. Any other methods for determining the transformation of the work piece 4 that will allow movement of the work piece 4 from its measured position to the desired adaptive position 62 on the fixture 6 are contemplated by the Invention.

Figure 17:
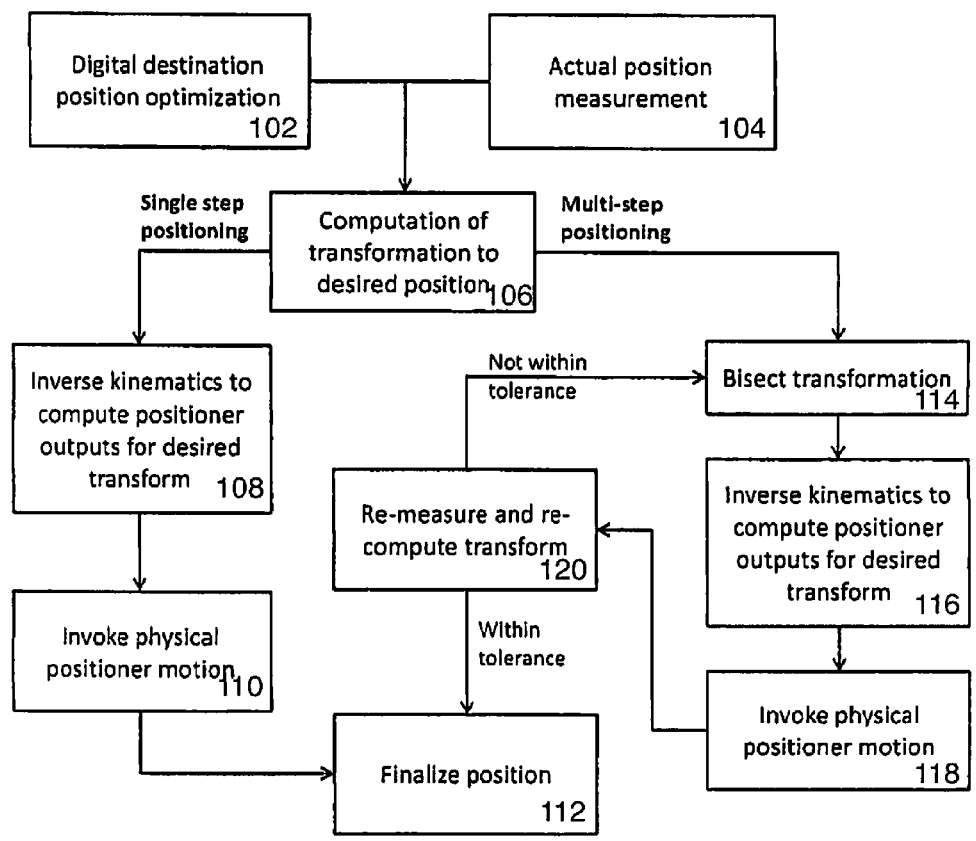
FIG. 17 is a block diagram that shows two exemplar positioning algorithms, one that performs single step positioning suitable for use on very accurate and repeatable positioners, and one that performs an error-compensating multi-step positioning process, which is slower, but that can be used on positioners that are less accurate and less repeatable.

FIG. 17 shows two possible algorithms for driving the positioner 24 with computer control to move the work piece 4 to the adaptive position 62. A single-step positioning algorithm is fast and adequate on positioners 24 with high accuracy and repeatability. A multi-step, or iterative, positioning algorithm is slower, but can provide dynamic error compensation for less accurate and repeatable positioners 24. In either case, step 102 requires that the adaptive position 62 be known (see FIG. 15) and step 104 requires that the first position 68 be known. In both cases, the computer 52 calculates a transformation for the positioner 24 to move the work piece 4 to the adaptive position 62 with respect to the fixture 6 (step 106). In both cases the algorithm terminates when the work piece 4 is in the adaptive position 62 with respect to the fixture 6 (step 112).

Steps 108 and 110 of FIG. 17 are the single-step positioning of the work piece 4. For the single step transformation, from step 108 the computer 52 applies inverse kinematics to describe each of the movements of the positioner 24 to move the work piece 4 to the adaptive position 62 with respect to the fixture 6. From step 110, the computer 52 directs the positioner 24 to apply those movements. The work piece 4 is placed in the adaptive position 62 with a single movement.

Steps 114 through 120 describe multi-step positioning of the work piece 4. From step 114 the computer 52 bisects the calculated transformation—essentially cutting the directed movement in half. The computer 52 calculates the movements of the positioner to achieve the bisected transformation in step 116. In step 118 the computer 52 instructs the positioner 24 to move the work piece 4 by one-half of the movement calculated to place the work piece 4 in the desired adaptive position 62. The computer 52 re-measures the location of the work piece 4 with respect to the desired adaptive position 62 on the fixture 6 in step 120. If the location of the work piece 4 is the adaptive position 62 within tolerance, then the process is complete (step 112) and the work piece 4 may be attached to the fixture 6. If the location of the work piece 4 is not the adaptive position 62 within tolerance, the process repeats.

As noted above, a 'non-adaptive fixture' is a fixture 6 that is not configured to be movable in multiple axes with respect to the tool of a CNC machine 8. The term 'non-adaptive fixture' also includes a fixture 6 that can be moved in multiple axes with respect to the tool of the CNC machine 8, but that is not used in an adaptive manner; for example, where the range and degree of motion of the fixture 6 are not adequate to move the work piece 4 from the first position 68 to the adaptive position 62. The term 'non-adaptive fixture' also includes a fixture 6 that moves the work piece 4 through only a portion of the distance or orientation changes required to move the work piece 4 from the first position 68 to the adaptive position 62.

The following is a glossary of terms used in this document that are not otherwise defined.

Transformation Matrix— a matrix which represents a linear transformation in an arbitrary n-dimensional space, but in our case refers to transformations in Euclidian 3 dimensional space, which is used to model the real, physical world and how objects move in it. A linear "transformation" in 3 dimensional space is some combination of translation (moving), rotation (tilting), shearing (stretching sideways), and scaling (growing or shrinking) which can be done to any point, shape, or collection of points or shapes. In our case we only use rigid body transformations, which are limited to translation and rotation. A "transformation matrix" is a mathematically convenient way of storing and handling a transformation, since it can be easily applied to a position in space simply by multiplying it by the position. A rigid body transformation in 3 dimensional space can also be thought of as a combination of six numbers: translation in x, translation in y, translation in z, and rotation in x, rotation in y, and rotation in z. These six numbers can be turned into an equivalent transformation matrix and vice versa.

Bisection (transformation)—bisection is a means of "damping" the behavior of an algorithm to prevent it from overshooting its target or getting stuck in an infinite loop jumping back and forth across its goal. In the case of the transformation bisection, we take the desired motion in terms of the six transformation numbers: tx, ty, tz, rx, ry, and rz and divide them each by two. The intention is that we will gradually approach our goal until we get close enough that we determine the outcome to be adequate. This is only necessary because in the case of certain embodiments where the multistep positioning technique is used we cannot count on the digitally computed transformation being anything more than a rough approximation of what the physical system will do when instructed to move. If the disparity between the digital and the actual is great enough, the positioning may not ever approach the desired destination without the 'damping' that bisection provides.

Inverse Kinematics—inverse kinematics refers to solving a general class of problem of knowing a desired position of the end (in our case the grasping end) of a multi-axis positioning system and needing to compute joint or actuator positions for the system that will produce the desired position. There are many well-established methods of performing inverse kinematics.

Hexapod table—a full six-degree-of-freedom positioning system that uses a table and a platform with six linear actuators arranged between them. There are three mounting locations for the six actuators on the bottom platform and three locations on the upper table. The two sets of mounting locations are rotated 60° degrees from each other. As such the hexapod table is mechanically very simple, but through a very complex control scheme is capable of limited motion in all six spatial degrees of freedom: translation in x, y, and z, and rotation in x, y, and z.

Structured light scanner—a 3D scanner capable of digitally capturing x, y, and z positions on the physical surface of an object through the use of a wide array of techniques employing projected light patterns and one or more cameras.

Laser scanner—a 3D scanner capable of digitally capturing x, y, and z positions on the physical surface of an object using projected laser light. Some laser scanners use structured light techniques and others use time-of-flight based measurement methods.

Minimal surface capture—from FIG. 11, minimal surface capture means the acquisition of just enough digital surface data to be geometrically unique such that a fitting algorithm could correctly align it to the correct location and orientation on a complete set of surface data for the same part. Typically this requires capturing regions of the surface whose surface normals (the direction the surface is facing) contain three substantially orthogonal components in an area of the part whose topology is not duplicated elsewhere on its body. In less technical terms this usually means capturing a feature on the body of a part that somewhat resembles a corner: three faces that all point in roughly different directions. It also means capturing a feature on the part that is unique and not patterned or copied elsewhere.

The following are the numbered elements.
2 adaptive positioning system
4 a work piece
6 a fixture
8 CNC machine
10 a machined object
12 a casting
14 a forging
16 a layup
18 machined object volume
20 work piece volume
22 single rigid assembly
24 a positioner
26 gripper
28 robot arm
30 a measuring apparatus
32 comprehensive measurement
34 a contact scanner 36 coordinate measuring machine
38 a non-contact scanner
40 a light scanner
42 a structured light scanner
44 a laser scanner
46 an ultrasound scanner
48 an x-ray scanner
50 a magnetic resonance imager
52 a computer
54 a constraint
56 a material
58 a local characteristic
60 a desired location of constraints
62 an adaptive position
64 a locator apparatus
66 a scanning location
68 a first position
72 series of CNC machines
74 work holding feature
76 laser targets
78 laser tracking device

We claim:

1. A system for fixturing a work piece for transforming the work piece to a machined object by performing a machining operation by one or more CNC machines on the work piece, each of the CNC machines having a table or other work holding feature, each of the CNC machines having a tool for operation on the work piece, the system comprising:
   a. a fixture, said fixture not being configured to be movable in multiple axes with respect to the tool of the CNC machine when said fixture is attached to the table or other work holding feature of the CNC machine, said fixture being repeatably attachable to each of the one or more CNC machines, said fixture being configured for attachment to the work piece, said fixture being configured to support the work piece during the machining operation when said fixture is repeatably attached to each of the one or more CNC machines;
   b. a measuring apparatus, said measuring apparatus being configured to generate a comprehensive measurement of the work piece in three dimensions, said comprehensive measurement being adequate to identify an adaptive position of the work piece to a required level of precision in three dimensions with respect to said fixture so that an interior volume of the machined object will be disposed within an interior volume defined by the work piece when the work piece is attached to said fixture and said fixture is repeatably attached to said one or more CNC machines and said one or more CNC machines perform said machining operation on the work piece;
   c. a positioner, said positioner being configured to selectably retain the work piece;
   d. a computer, said computer being operably attached to said measuring apparatus and to said positioner, said computer being configured to receive said comprehensive measurement of the work piece from said measuring apparatus, said computer being configured to determine said adaptive position of the work piece with respect to said fixture, said computer having a configuration to direct said positioner to move the work piece to said adaptive position with respect to said fixture for attachment of the work piece to said fixture, said positioner being configured to move the work piece to said adaptive position with respect to said fixture as directed by said computer.

2. The system of claim 1, the system further comprising: a locator apparatus, said locator apparatus being configured to detect a first position of the work piece, said locator apparatus being in operable communication with said computer wherein said configuration of said computer to direct said positioner to move the work piece to said adaptive position comprises: said computer is configured to determine a transformation to move the work piece from said first position to said adaptive position, said computer being configured to cause said positioner to move the work piece consistent with said transformation.

3. The system of claim 2 wherein said locator apparatus is said measuring apparatus.

4. The system of claim 2 wherein said measuring apparatus is a contact scanner or a non-contact scanner.

5. The system of claim 4 wherein said contact scanner comprises a coordinate measuring machine.

6. The system of claim 4 wherein said non-contact scanner is selected from a list consisting of: a light scanner, an ultrasound scanner, an x-ray scanner and a magnetic resonance imager.

7. The system of claim 4, the system further comprising: a scanning location, said positioner is configured to retain the work piece at said scanning location, said scanner is configured to generate said comprehensive measurement of the work piece when the work piece is located at said scanning location.

8. The system of claim 7 wherein said positioner is configured to exhibit a first portion of the work piece to said scanner at said scanning location and is configured to then release and re-grasp the work piece and to exhibit a second portion of the work piece to said scanner at said scanning location, whereby said scanner can determine said comprehensive measurement of the work piece when said positioner occludes the ability of said scanner to scan the work piece.

9. The system of claim 2 wherein said locator apparatus is configured to determine said first position of the work piece when the work piece is retained by said positioner.

10. The system of claim 2 wherein said locator apparatus is a laser scanner, said laser scanner being configured to locate a plurality of laser targets disposed on the work piece.

11. The system of claim 1 wherein said computer is configured to consider a constraint of the work piece in determining said adaptive position of the work piece.

12. The system of claim 11 wherein said constraint comprises: a local characteristic of a material composing the work piece.

13. The system of claim 1 wherein the work piece is a one of a casting, a forging and a layup.

14. The system of claim 1 wherein said fixture is located on a work holding feature of the CNC machine.

15. A method for fixturing a work piece for transforming the work piece to a machined object by a machining operation by one or more CNC machines, each of the CNC machines having a table or other work holding feature, each of the CNC machines having a tool for operation on the work piece, the method comprising:
   a. measuring the work piece to generate a comprehensive measurement to a required level of precision in three dimensions;
   b. comparing said comprehensive measurement of the work piece to a dimension of the machined object;
   c. identifying an adaptive position of the work piece on a fixture, said fixture not being configured to be movable in multiple axes with respect to the tool of the CNC machine when said fixture is attached to the table or other work holding feature of the CNC machine, by which a volume defining the machined object will be disposed within a volume defined by the work piece when the work piece is attached to said fixture and said fixture is repeatably attached to the one or more CNC machines and the CNC machines perform said machining operation on the work piece;
  d. positioning the work piece with respect to said fixture and attaching the work piece to the said fixture in said adaptive position.

16. The method of claim 15 wherein said step of positioning the work piece comprises:
  a. identifying a first position of the work piece;
  b. determining a transformation to move the work piece from said first position to said adaptive position on said non-adaptive fixture;
  c. moving the work piece from said first position to said adaptive position using said transformation.

17. The method of claim 16 wherein said measurement apparatus is configured to perform said step of identifying said first position of the work piece.

18. The method of claim 16 wherein said step of measuring the work piece comprises scanning the work piece by a contact scanner or by a non-contact scanner.

19. The method of claim 18 wherein said contact scanner comprises a coordinate measuring machine.

20. The method of claim 18 wherein said non-contact scanner is selected from a list consisting of: a light scanner, an ultrasound scanner, an x-ray scanner, and a magnetic resonance imager.

21. The method of claim 18 wherein said step of measuring the work piece comprises:
  a. retaining the work piece by a positioner;
  b. moving the work piece by said positioner to a scanning location;
  c. scanning the work piece at said scanning location by a scanner to determine said comprehensive measurement.

22. The method of claim 21 wherein said step of scanning the work piece at said scanning location comprises:
  a. exhibiting a first portion of the work piece to said scanner by said positioner;
  b. releasing the work piece by said positioner;
  c. retaining the work piece a second time by said positioner;
  d. exhibiting a second portion of the work piece to said scanner by said positioner, whereby said scanner can generate a comprehensive measurement when the work piece is partially occluded by said positioner.

23. The method of claim 16 wherein said step of identifying said first position of the work piece comprises: determining said first position while the work piece is retained by a positioner.

24. The method of claim 23 wherein said step of moving the work piece to said adaptive position from said first position comprises: moving the work piece by said positioner.

25. The method of claim 16 wherein the work piece is one of a casting, a forging and a layup.

26. The method of claim 16 wherein said step of identifying said first position of the work piece comprises scanning the work piece with a laser scanner while a plurality of laser targets are disposed on the work piece.

27. The method of claim 15 wherein the work piece defines a constraint, said step of identifying said adaptive position of the work piece on said non-adaptive fixture comprises: identifying said adaptive position corresponding to a desired location of said constraint on the machined object.

28. The method of claim 27 wherein said constraint consists of a local characteristic of a material composing the work piece.

29. The method of claim 15 wherein said non-adaptive fixture is attached to a work-holding surface of the CNC machine.

* * * * *